(12) United States Patent
Mosier et al.

(10) Patent No.: US 10,494,584 B2
(45) Date of Patent: Dec. 3, 2019

(54) LUBRICANT COMPOSITIONS FOR DIRECT INJECTION ENGINES

(71) Applicant: The Lubrizol Corporation, Wickliffe, OH (US)

(72) Inventors: Patrick E. Mosier, Bay Village, OH (US); Jeffry G. Dietz, Shaker Heights, OH (US); Alexander Sammut, Chardon, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 15/022,345

(22) PCT Filed: Sep. 19, 2014

(86) PCT No.: PCT/US2014/056445
§ 371 (c)(1),
(2) Date: Mar. 16, 2016

(87) PCT Pub. No.: WO2015/042340
PCT Pub. Date: Mar. 26, 2015

(65) Prior Publication Data
US 2016/0230116 A1   Aug. 11, 2016

Related U.S. Application Data

(60) Provisional application No. 61/879,725, filed on Sep. 19, 2013.

(51) Int. Cl.
| | | |
|---|---|---|
| *C10M 169/04* | (2006.01) | |
| *C10M 129/50* | (2006.01) | |
| *C10M 137/10* | (2006.01) | |
| *C10M 135/18* | (2006.01) | |
| *C10M 133/04* | (2006.01) | |
| *C10M 133/44* | (2006.01) | |
| *C10M 159/12* | (2006.01) | |
| *C10M 163/00* | (2006.01) | |
| *C10M 101/00* | (2006.01) | |
| *C10M 135/10* | (2006.01) | |
| *C10M 101/02* | (2006.01) | |
| *C10M 129/10* | (2006.01) | |

(52) U.S. Cl.
CPC ........ *C10M 169/04* (2013.01); *C10M 101/00* (2013.01); *C10M 129/50* (2013.01); *C10M 133/04* (2013.01); *C10M 133/44* (2013.01); *C10M 135/10* (2013.01); *C10M 135/18* (2013.01); *C10M 137/10* (2013.01); *C10M 159/12* (2013.01); *C10M 163/00* (2013.01); *C10M 101/02* (2013.01); *C10M 129/10* (2013.01); *C10M 2207/023* (2013.01); *C10M 2207/028* (2013.01); *C10M 2207/262* (2013.01); *C10M 2215/02* (2013.01); *C10M 2215/223* (2013.01); *C10M 2215/28* (2013.01); *C10M 2219/046* (2013.01); *C10M 2219/068* (2013.01); *C10N 2240/104* (2013.01)

(58) Field of Classification Search
CPC ............. C10M 129/10; C10M 129/50; C10M 129/91; C10M 135/10; C10M 169/04; C10M 101/00; C10M 163/00; C10M 2207/028; C10M 2207/262; C10M 2215/28; C10M 2219/046; C10N 2240/104
See application file for complete search history.

(56) References Cited

U.S. PATENT DOCUMENTS

| | | | | |
|---|---|---|---|---|
| 2006/0281645 | A1* | 12/2006 | Bell | C10M 159/22 508/460 |
| 2011/0160108 | A1* | 6/2011 | Cook | C10M 159/24 508/391 |
| 2012/0089343 | A1* | 4/2012 | Kar | F02D 19/084 702/24 |
| 2012/0186225 | A1* | 7/2012 | Amann | F02D 35/028 60/274 |
| 2013/0263807 | A1* | 10/2013 | Cook | C10M 165/00 123/1 A |
| 2014/0031269 | A1* | 1/2014 | Price | C10M 149/00 508/306 |

FOREIGN PATENT DOCUMENTS

| | | | |
|---|---|---|---|
| JP | 2014152301 A | 8/2014 | |
| WO | 2012047949 A1 | 4/2012 | |
| WO | WO 2012047949 A1 * | 4/2012 | .......... C10M 165/00 |
| WO | WO 2012096864 A1 * | 7/2012 | .......... C10M 149/00 |

* cited by examiner

*Primary Examiner* — Taiwo Oladapo
(74) *Attorney, Agent, or Firm* — Michael Miller; Deron Cook; Teresan Gilbert

(57) ABSTRACT

The invention is directed to a method for reducing low speed pre-ignition events in a spark-ignited direct injection internal combustion engine by supplying to the sump a lubricant composition which contains an oil of lubricating viscosity and a metal overbased detergent. The metal overbased detergent may be selected from sulfonate detergents, phenate detergents, and salicylate detergents, especially sulfonate detergents with a metal ratio of at least 5.

10 Claims, No Drawings

LUBRICANT COMPOSITIONS FOR DIRECT INJECTION ENGINES

BACKGROUND OF THE INVENTION

The disclosed technology relates to lubricants for internal combustion engines, particularly those for spark-ignited direct injection engines.

Modern engine designs are being developed to improve fuel economy without sacrificing performance or durability. Historically, gasoline was port-fuel injected (PFI), that is, injected through the air intake and entering the combustion chamber via the air intake valve. Gasoline direct injection (GDI) involves direct injection of gasoline into the combustion chamber.

In certain situations, the internal combustion engine may exhibit abnormal combustion. Abnormal combustion in a spark-initiated internal combustion engine may be understood as an uncontrolled explosion occurring in the combustion chamber as a result of ignition of combustible elements therein by a source other than the igniter.

Pre-ignition may be understood as an abnormal form of combustion resulting from ignition of the air-fuel mixture prior to ignition by the igniter. Anytime the air-fuel mixture in the combustion chamber is ignited prior to ignition by the igniter, such may be understood as pre-ignition. It will also be understood that ignition events generally increase in likelihood as the air-fuel ratio becomes leaner. As such, one approach to preventing pre-ignition events in GDI engines has been to intentionally inject additional fuel (i.e., to overfuel), thereby adjusting the air-fuel ratio to a richer mixture that is less favorable to pre-ignition events. This approach has successfully treated LSPI, but more current fuel efficiency and economy standards are causing engine manufacturers to adopt leaner air-fuel mixtures, which leads to the need for alternative approaches to preventing or reducing LSPI events.

Without being bound to a particular theory, traditionally, pre-ignition has occurred during high speed operation of an engine when a particular point within the combustion chamber of a cylinder may become hot enough during high speed operation of the engine to effectively function as a glow plug (e.g. overheated spark plug tip, overheated burr of metal) to provide a source of ignition which causes the air-fuel mixture to ignite before ignition by the igniter. Such pre-ignition may be more commonly referred to as hot-spot pre-ignition, and may be inhibited by simply locating the hot spot and eliminating it.

More recently, vehicle manufacturers have observed intermittent abnormal combustion in their production of turbocharged gasoline engines, particularly at low speeds and medium-to-high loads. More particularly, when operating the engine at speeds less than or equal to 3,000 rpm and under a load with a brake mean effective pressure (BMEP) of greater than or equal to 10 bars, a condition which may be referred to as low-speed pre-ignition (LSPI) may occur in a very random and stochastic fashion.

The disclosed technology provides a method for reducing, inhibiting, or even eliminating LSPI events in direct injection engines by operating the engines with a lubricant that contains a metal overbased detergent.

SUMMARY OF THE INVENTION

The disclosed technology provides a method for reducing low speed pre-ignition events in a spark-ignited direct injection internal combustion engine comprising supplying to the sump a lubricant composition which contains an oil of lubricating viscosity and a metal overbased detergent. The metal overbased detergent may be selected from sulfonate detergents, phenate detergents, and salicylate detergents, especially sulfonate detergents.

The invention provides method for reducing low speed pre-ignition events in a spark-ignited direct injection internal combustion engine comprising supplying to the engine a lubricant composition comprising a base oil of lubricating viscosity and a metal overbased detergent.

The invention further provides the method described herein in which the engine is operated under a load with a brake mean effective pressure (BMEP) of greater than or equal to 10 bars.

The invention further provides the method described herein in which the engine is operated at speeds less than or equal to 3,000 rpm.

The invention further provides the method described herein in which the engine is fueled with a liquid hydrocarbon fuel, a liquid nonhydrocarbon fuel, or mixtures thereof.

The invention further provides the method described herein in which the engine is fueled by natural gas, liquefied petroleum gas (LPG), compressed natural gas (CNG), or mixtures thereof.

The invention further provides the method described herein in which the metal overbased detergent includes one or more of a sulfonate detergent, a phenate detergent, a salicylate detergent, and combinations thereof.

The invention further provides the method described herein in which the lubricant composition further includes at least one other additive selected from an ashless dispersant, an ashless antioxidant, a phosphorus-containing anti-wear additive, a friction modifier, and a polymeric viscosity modifier.

The invention further provides the method described herein in which the metal overbased detergent comprises a sulfonate detergent.

The invention further provides the method described herein in which the metal overbased detergent comprises a salicylate detergent.

The invention further provides the method described herein in which the metal overbased detergent comprises an alkali metal or an alkaline earth metal detergent.

The invention further provides the method described herein in which the metal overbased detergent has a metal ratio of 5 to 30.

The invention further provides the method described herein in which the metal overbased detergent is present in an amount from 0.2 to 8 weight percent of the lubricant composition.

The invention further provides the method described herein in which the lubricating composition further includes a polyalkenyl succinimide dispersant in an amount from 0.5 to 4 weight % of the composition.

The invention further provides the method described herein in which the lubricating composition includes at least 50 weight % of a Group II base oil, a Group III base oil, or mixtures thereof.

The invention further provides the method described herein in which the metal overbased detergent comprises a sulfur-coupled phenate detergent.

The invention further provides the method described herein in which the metal overbased detergent is present in an amount to provide 0.1 weight percent to 0.9 weight percent sulfated ash to the lubricating composition.

The invention further provides the method described herein in which there is a reduction in the number of LSPI events of at least 10 percent.

The invention further provides the method described herein in which the low speed pre-ignition events are reduced to less than 20 LSPI events per 100,000 combustion events.

DETAILED DESCRIPTION

Various preferred features and embodiments will be described below by way of non-limiting illustration.

As indicated above, when operating the engine at speeds less than or equal to 3,000 rpm and under a load with a brake mean effective pressure (BMEP) of greater than or equal to 10 bars, a low-speed pre-ignition (LSPI) event may occur in the engine. A LSPI event may consist of one or more LSPI combustion cycles, and generally consists of multiple LSPI combustion cycles which occur in a consecutive fashion or alternating fashion with normal combustion cycles in between. Without being bound to a particular theory, LSPI may result from a combustion of oil droplet(s), or a droplet(s) of oil-fuel mixture, or combinations thereof, which may accumulate, for example, in the top land crevices volume of a piston, or the piston ring-land and ring-groove crevices. The lubricant oil may be transferred from below the oil control ring to the piston top land area due to unusual piston ring movements. At low speed, high load conditions, in-cylinder pressures dynamics (compression and firing pressures) may be considerably different from in-cylinder pressures at lower loads, particularly due to strongly retarded combustion phasing and high boost and peak compression pressures which can influence ring motion dynamics.

At the foregoing loads, LSPI, which may be accompanied by subsequent detonation and/or severe engine knock, can cause severe damage to the engine very quickly (often within 1 to 5 engine cycles). Engine knock may occur with LSPI given that, after the normal spark from the igniter is provided, multiple flames may be present. The present invention aims to provide a method for inhibiting or reducing LSPI events, the method involving supplying to the engine a lubricant comprising a metal overbased detergent.

In one embodiment of the invention, the engine is operated at speeds between 500 rpm and 3000 rpm, or 800 rpm to 2800 rpm, or even 1000 rpm to 2600 rpm. Additionally, the engine may be operated with a brake mean effective pressure of 10 bars to 30 bars, or 12 bars to 24 bars.

LSPI events, while comparatively uncommon, may be catastrophic in nature. Hence drastic reduction or even elimination of LSPI events during normal or sustained operation of a direct fuel injection engine is desirable. In one embodiment, the method of the invention is such that there are less than 20 LSPI events per 100,000 combustion events or less than 10 LSPI events per 100.000 combustion events. In one embodiment, there may be less than 5 LSPI events per 100.000 combustion events, less than 3 LSPI events per 100.000 combustion events; or there may be 0 LSPI events per 100.000 combustion events.

In one embodiment, the method of the invention provides a reduction in the number of LSPI events of at least 10 percent, or at least 20 percent, or at least 30 percent, or at least 50 percent.

Fuel

The method of the present invention involves operating a spark-ignited internal combustion engine. In addition to the engine operating conditions and the lubricant composition, the composition of the fuel may impact LSPI events. In one embodiment, the fuel may comprise a fuel which is liquid at ambient temperature and is useful in fueling a spark ignited engine, a fuel which is gaseous at ambient temperatures, or combinations thereof.

The liquid fuel is normally a liquid at ambient conditions e.g., room temperature (20 to 30° C.). The fuel can be a hydrocarbon fuel, a nonhydrocarbon fuel, or a mixture thereof. The hydrocarbon fuel may be a gasoline as defined by ASTM specification D4814. In an embodiment of the invention the fuel is a gasoline, and in other embodiments the fuel is a leaded gasoline, or a nonleaded gasoline.

The nonhydrocarbon fuel can be an oxygen containing composition, often referred to as an oxygenate, to include an alcohol, an ether, a ketone, an ester of a carboxylic acid, a nitroalkane, or a mixture thereof. The nonhydrocarbon fuel can include for example methanol, ethanol, methyl t-butyl ether, methyl ethyl ketone, transesterified oils and/or fats from plants and animals such as rapeseed methyl ester and soybean methyl ester, and nitromethane. Mixtures of hydrocarbon and nonhydrocarbon fuels can include, for example, gasoline and methanol and/or ethanol. In an embodiment of the invention, the liquid fuel is a mixture of gasoline and ethanol, wherein the ethanol content is at least 5 volume percent of the fuel composition, or at least 10 volume percent of the composition, or at least 15 volume percent, or 15 to 85 volume percent of the composition. In one embodiment, the liquid fuel contains less than 15% by volume ethanol content, less than 10% by volume ethanol content, less than 5% ethanol content by volume, or is substantially free of (i.e. less than 0.5% by volume) of ethanol.

In several embodiments of this invention, the fuel can have a sulfur content on a weight basis that is 5000 ppm or less, 1000 ppm or less, 300 ppm or less, 200 ppm or less, 30 ppm or less, or 10 ppm or less. In another embodiment, the fuel can have a sulfur content on a weight basis of 1 to 100 ppm. In one embodiment, the fuel contains about 0 ppm to about 1000 ppm, about 0 to about 500 ppm, about 0 to about 100 ppm, about 0 to about 50 ppm, about 0 to about 25 ppm, about 0 to about 10 ppm, or about 0 to 5 ppm of alkali metals, alkaline earth metals, transition metals or mixtures thereof. In another embodiment the fuel contains 1 to 10 ppm by weight of alkali metals, alkaline earth metals, transition metals or mixtures thereof.

The gaseous fuel is normally a gas at ambient conditions e.g., room temperature (20 to 30° C.). Suitable gas fuels include natural gas, liquefied petroleum gas (LPG), compressed natural gas (CNG), or mixtures thereof. In one embodiment, the engine is fueled with natural gas.

The fuel compositions of the present invention can further comprise one or more performance additives. Performance additives can be added to a fuel composition depending on several factors, including the type of internal combustion engine and the type of fuel being used in that engine, the quality of the fuel, and the service conditions under which the engine is being operated. In some embodiments, the performance additives added are free of nitrogen. In other embodiments, the additional performance additives may contain nitrogen.

The performance additives can include an antioxidant such as a hindered phenol or derivative thereof and/or a diarylamine or derivative thereof; a corrosion inhibitor such as an alkenylsuccinic acid; and/or a detergent/dispersant additive, such as a polyetheramine or nitrogen containing detergent, including but not limited to polyisobutylene (PIB) amine dispersants, Mannich detergents, succinimide dispersants, and their respective quaternary ammonium salts.

The performance additives may also include a cold flow improver, such as an esterified copolymer of maleic anhydride and styrene and/or a copolymer of ethylene and vinyl acetate; a foam inhibitor, such as a silicone fluid; a demulsifier such as a polyoxyalkylene and/or an alkyl polyether alcohol; a lubricity agent such as a fatty carboxylic acid, ester and/or amide derivatives of fatty carboxylic acids, or ester and/or amide derivatives of hydrocarbyl substituted succinic anhydrides; a metal deactivator, such as an aromatic triazole or derivative thereof, including but not limited to a benzotriazole such as tolytriazole; and/or a valve seat recession additive, such as an alkali metal sulfosuccinate salt. The additives may also include a biocide, an antistatic agent, a deicer, a fluidizer, such as a mineral oil and/or a poly(alpha-olefin) and/or a polyether, and a combustion improver, such as an octane or cetane improver.

The fluidizer may be a polyetheramine or a polyether compound. The polyetheramine can be represented by the formula $R[-OCH_2CH(R^1)]_nA$, where R is a hydrocarbyl group, $R^1$ is selected from the group consisting of hydrogen, hydrocarbyl groups of 1 to 16 carbon atoms, and mixtures thereof, n is a number from 2 to about 50, and A is selected from the group consisting of $-OCH_2CH_2CH_2NR^2R^2$ and $-NR^3R^3$, where each $R^2$ is independently hydrogen or hydrocarbyl, and each $R^3$ is independently hydrogen, hydrocarbyl or $-[R^4N(R^5)]_pR^6$, where $R^4$ is $C_2$-$C_{10}$ alkylene, $R^5$ and $R^6$ are independently hydrogen or hydrocarbyl, and p is a number from 1-7.

The fluidizer can be a polyether, which can be represented by the formula $R^7O[CH_2CH(R^8)O]_qH$, where $R^7$ is a hydrocarbyl group, $R^8$ is selected from the group consisting of hydrogen, hydrocarbyl groups of 1 to 16 carbon atoms, and mixtures thereof, and q is a number from 2 to about 50. The fluidizer can be a hydrocarbyl-terminated poly(oxyalkylene) aminocarbamate as described U.S. Pat. No. 5,503,644. The fluidizer can be an alkoxylate, wherein the alkoxylate can comprise: (i) a polyether containing two or more ester terminal groups; (ii) a polyether containing one or more ester groups and one or more terminal ether groups; or (iii) a polyether containing one or more ester groups and one or more terminal amino groups, wherein a terminal group is defined as a group located within five connecting carbon or oxygen atoms from the end of the polymer. Connecting is defined as the sum of the connecting carbon and oxygen atoms in the polymer or end group.

The performance additives which may be present in the fuel additive compositions and fuel compositions of the present invention also include di-ester, di-amide, ester-amide, and ester-imide friction modifiers prepared by reacting a dicarboxylic acid (such as tartaric acid) and/or a tricarboxylic acid (such as citric acid), with an amine and/or alcohol, optionally in the presence of a known esterification catalyst. These friction modifiers often derived from tartaric acid, citric acid, or derivatives thereof, may be derived from amines and/or alcohols that are branched so that the friction modifier itself has significant amounts of branched hydrocarbyl groups present within it structure. Examples of suitable branched alcohols used to prepare these friction modifiers include 2-ethylhexanol, isotridecanol, Guerbet alcohols, or mixtures thereof.

In different embodiments the fuel composition may have a composition as described in the following table:

| Additive | Embodiments (ppm) | | |
|---|---|---|---|
| | A | C | D |
| Detergent/dispersant | 0 to 2500 | 25 to 150 | 500 to 2500 |
| Fluidizer | 0 to 5000 | 1 to 250 | 3000 to 5000 |
| Demulsifier | 0 to 50 | 0.5 to 5 | 1 to 25 |
| Corrosion Inhibitor | 0 to 200 | .5 to 10 | 20 to 200 |
| Antioxidant | 0 to 1000 | 5 to 125 | 500 to 1000 |
| Friction Modifier | 0 to 600 | 50 to 175 | 100 to 750 |
| Fuel | Balance to 100% | Balance to 100% | Balance to 100% |

Oil of Lubricating Viscosity

The lubricating composition comprises an oil of lubricating viscosity. Such oils include natural and synthetic oils, oil derived from hydrocracking, hydrogenation, and hydrofinishing, unrefined, refined, re-refined oils or mixtures thereof. A more detailed description of unrefined, refined and re-refined oils is provided in International Publication WO2008/147704, paragraphs [0054] to [0056] (a similar disclosure is provided in US Patent Publication 2010/0197536, see [0072] to [0073]). A more detailed description of natural and synthetic lubricating oils is described in paragraphs [0058] to [0059] respectively of WO2008/147704 (a similar disclosure is provided in US Patent Publication 2010/0197536, see [0075] to [0076]). Synthetic oils may also be produced by Fischer-Tropsch reactions and typically may be hydroisomerised Fischer-Tropsch hydrocarbons or waxes. In one embodiment, oils may be prepared by a Fischer-Tropsch gas-to-liquid synthetic procedure as well as other gas-to-liquid oils.

Oils of lubricating viscosity may also be defined as specified in the April 2008 version of "Appendix E—API Base Oil Interchangeability Guidelines for Passenger Car Motor Oils and Diesel Engine Oils", section 1.3 Subheading 1.3. "Base Stock Categories". The API Guidelines are also summarized in U.S. Pat. No. 7,285,516 (see column 11, line 64 to column 12, line 10). In one embodiment, the oil of lubricating viscosity may be an API Group II, Group III, or Group IV oil, or mixtures thereof. The five base oil groups are as follows:

| Base Oil Category | Sulfur (%) | Saturates (%) | Viscosity Index |
|---|---|---|---|
| Group I | >0.03 and/or | <90 | 80 to 120 |
| Group II | ≤0.03 and | ≥90 | 80 to 120 |
| Group III | ≤0.03 and | ≥90 | ≥120 |
| Group IV | All polyalphaolefins (PAO) | | |
| Group V | All others not included in Groups I, II, III, or IV | | |

The amount of the oil of lubricating viscosity present is typically the balance remaining after subtracting from 100 weight % (wt %) the sum of the amount of the compound of the invention and the other performance additives.

The lubricating composition may be in the form of a concentrate and/or a fully formulated lubricant. If the lubricating composition of the invention (comprising the additives disclosed herein) is in the form of a concentrate which may be combined with additional oil to form, in whole or in part, a finished lubricant), the ratio of the of these additives to the oil of lubricating viscosity and/or to diluent oil include the ranges of 1:99 to 99:1 by weight, or 80:20 to 10:90 by weight.

In one embodiment, the base oil has a kinematic viscosity at 100° C. from 2 $mm^2$/s (centiStokes—cSt) to 16 $mm^2$/s, from 3 $mm^2$/s to 10 $mm^2$/s, or even from 4 $mm^2$/s to 8 $mm^2$/s.

The ability of a base oil to act as a solvent (i.e. solvency) may be a contributing factor in increasing the frequency of LSPI events during operation of a direct fuel-injected engine. Base oil solvency may be measured as the ability of an un-additized base oil to act as a solvent for polar constituents. In general, base oil solvency decreases as the base oil group moves from Group I to Group IV (PAO). That is, solvency of base oil may be ranked as follows for oil of a given kinematic viscosity: Group I>Group II>Group III>Group IV. Base oil solvency also decreases as the viscosity increases within a base oil group; base oil of low viscosity tends to have better solvency than similar base oil of higher viscosity. Base oil solvency may be measured by aniline point (ASTM D611).

In one embodiment, the base oil comprises at least 30 wt % of Group II or Group III base oil. In another embodiment, the base oil comprises at least 60 weight % of Group II or Group III base oil, or at least 80 wt % of Group II or Group III base oil. In one embodiment, the lubricant composition comprises less than 20 wt % of Group IV (i.e. polyalphaolefin) base oil. In another embodiment, the base oil comprises less than 10 wt % of Group IV base oil. In one embodiment, the lubricating composition is substantially free of (i.e. contains less than 0.5 wt %) of Group IV base oil.

Ester base fluids, which are characterized as Group V oils, have high levels of solvency as a result of their polar nature. Addition of low levels (typically less than 10 wt %) of ester to a lubricating composition may significantly increase the resulting solvency of the base oil mixture. Esters may be broadly grouped into two categories: synthetic and natural. An ester base fluid would have a kinematic viscosity at 100° C. suitable for use in an engine oil lubricant, such as between 2 cSt and 30 cSt, or from 3 cSt to 20 cSt, or even from 4 cSt to 12 cSt.

Synthetic esters may comprise esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, and alkenyl malonic acids) with any of variety of monohydric alcohols (e.g., butyl alcohol, hexyl alcohol, dodecyl alcohol, 2-ethylhexyl alcohol, ethylene glycol, diethylene glycol monoether, and propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid. Other synthetic esters include those made from C5 to C12 monocarboxylic acids and polyols and polyol ethers such as neopentyl glycol, trimethylolpropane, pentaerythritol, dipentaerythritol, and tripentaerythritol. Esters can also be monoesters of monocarboxylic acids and monohydric alcohols.

Natural (or bio-derived) esters refer to materials derived from a renewable biological resource, organism, or entity, distinct from materials derived from petroleum or equivalent raw materials. Natural esters include fatty acid triglycerides, hydrolyzed or partially hydrolyzed triglycerides, or transesterified triglyceride esters, such as fatty acid methyl ester (or FAME). Suitable triglycerides include, but are not limited to, palm oil, soybean oil, sunflower oil, rapeseed oil, olive oil, linseed oil, and related materials. Other sources of triglycerides include, but are not limited to, algae, animal tallow, and zooplankton. Methods for producing biolubricants from natural triglycerides are described in, e.g., United States Patent Publication 2011/0009300A1.

In one embodiment, the lubricating composition comprises at least 2 wt % of an ester base fluid. In one embodiment the lubricating composition of the invention comprises at least 4 wt % of an ester base fluid, or at least 7 wt % of an ester base fluid, or even at least 10 wt % of an ester base fluid.

Metal Overbased Detergent

Metal overbased detergents, otherwise referred to as overbased detergents, metal-containing overbased detergents or superbased salts, are characterized by a metal content in excess of that which would be necessary for neutralization according to the stoichiometry of the metal and the particular acidic organic compound, i.e. the substrate, reacted with the metal. The overbased detergent may comprise one or more of non-sulfur containing phenates, sulfur containing phenates, sulfonates, salicylates, and mixtures thereof.

The amount of excess metal is commonly expressed in terms of substrate to metal ratio. The terminology "metal ratio" is used in the prior art and herein to define the ratio of the total chemical equivalents of the metal in the overbased salt to the chemical equivalents of the metal in the salt which would be expected to result from the reaction between the hydrocarbyl substituted organic acid; the hydrocarbyl-substituted phenol or mixtures thereof to be overbased, and the basic metal compound according to the known chemical reactivity and the stoichiometry of the two reactants. Thus, in a normal or neutral salt (i.e. soap) the metal ratio is one and, in an overbased salt, the metal ratio is greater than one, especially greater than 1.3. The overbased detergent of the invention may have a metal ratio of 5 to 30, or a metal ratio of 7 to 22, or a metal ratio of at least 11.

The metal-containing detergent may also include "hybrid" detergents formed with mixed surfactant systems including phenate and/or sulfonate components, e.g. phenate-salicylates, sulfonate-phenates, sulfonate-salicylates, sulfonates-phenates-salicylates, as described, for example, in U.S. Pat. Nos. 6,429,178; 6,429,179; 6,153,565; and 6,281,179. Where, for example, a hybrid sulfonate/phenate detergent is employed, the hybrid detergent would be considered equivalent to amounts of distinct phenate and sulfonate detergents introducing like amounts of phenate and sulfonate soaps, respectively. Overbased phenates and salicylates typically have a total base number of 180 to 450 TBN. Overbased sulfonates typically have a total base number of 250 to 600, or 300 to 500. Overbased detergents are known in the art.

Alkylphenols are often used as constituents in and/or building blocks for overbased detergents. Alkylphenols may be used to prepare phenate, salicylate, salixarate, or saligenin detergents or mixtures thereof. Suitable alkylphenols may include para-substituted hydrocarbyl phenols. The hydrocarbyl group may be linear or branched aliphatic groups of 1 to 60 carbon atoms, 8 to 40 carbon atoms, 10 to 24 carbon atoms, 12 to 20 carbon atoms, or 16 to 24 carbon atoms. In one embodiment, the alkylphenol overbased detergent is prepared from an alkylphenol or mixture thereof that is free of or substantially free of (i.e. contains less than 0.1 weight percent) p-dodecylphenol. In one embodiment, the lubricating composition of the invention contains less than 0.3 weight percent of alkylphenol, less than 0.1 weight percent of alkylphenol, or less than 0.05 weight percent of alkylphenol.

The overbased metal-containing detergent may be alkali metal or alkaline earth metal salts. In one embodiment, the overbased detergent may be sodium salts, calcium salts, magnesium salts, or mixtures thereof of the phenates, sulfur-containing phenates, sulfonates, salixarates and salicylates. In one embodiment, the overbased detergent is a calcium detergent, a magnesium detergent or mixtures thereof. In one embodiment, the overbased calcium detergent may be present in an amount to deliver at least 500 ppm calcium by weight and no more than 3000 ppm calcium by weight, or at least 1000 ppm calcium by weight, or at least 2000 ppm calcium by weight, or no more than 2500 ppm calcium by weight to the lubricating composition. In one embodiment, the overbased detergent may be present in an amount to deliver no more than 500 ppm by weight of magnesium to the lubricating composition, or no more than 330 ppm by weight, or no more than 125 ppm by weight, or no more than 45 ppm by weight. In one embodiment, the lubricating composition is essentially free of (i.e. contains less than 10 ppm) magnesium resulting from the overbased detergent. In one embodiment, the overbased detergent may be present in an amount to deliver at least 200 ppm by weight of magnesium, or at least 450 ppm by weight magnesium, or at least 700 ppm by weight magnesium to the lubricating composition. In one embodiment, both calcium and magnesium containing detergents may be present in the lubricating composition. Calcium and magnesium detergents may be present such that the weight ratio of calcium to magnesium is 10:1 to 1:10, or 8:3 to 4:5, or 1:1 to 1:3. In one embodiment, the overbased detergent is free of or substantially free of sodium.

In one embodiment, the sulfonate detergent may be predominantly a linear alkylbenzene sulfonate detergent having a metal ratio of at least 8 as is described in paragraphs [0026] to [0037] of US Patent Publication 2005/065045 (and granted as U.S. Pat. No. 7,407,919). The linear alkylbenzene sulfonate detergent may be particularly useful for assisting in improving fuel economy. The linear alkyl group may be attached to the benzene ring anywhere along the linear chain of the alkyl group, but often in the 2, 3 or 4 position of the linear chain, and in some instances, predominantly in the 2 position, resulting in the linear alkylbenzene sulfonate detergent.

Salicylate detergents and overbased salicylate detergents may be prepared in at least two different manners. Carbonylation (also referred to as carboxylation) of a p-alkylphenol is described in many references including U.S. Pat. No. 8,399,388. Carbonylation may be followed by overbasing to form overbased salicylate detergent. Suitable p-alkylphenols include those with linear and/or branched hydrocarbyl groups of 1 to 60 carbon atoms. Salicylate detergents may also be prepared by alkylation of salicylic acid, followed by overbasing, as described in U.S. Pat. No. 7,009,072. Salicylate detergents prepared in this manner, may be prepared from linear and/or branched alkylating agents (usually 1-olefins) containing 6 to 50 carbon atoms, 10 to 30 carbon atoms, or 14 to 24 carbon atoms. In one embodiment, the overbased detergent of the invention is a salicylate detergent. In one embodiment, the salicylate detergent of the invention is free of unreacted p-alkylphenol (i.e. contains less than 0.1 weight percent). In one embodiment, the salicylate detergent of the invention is prepared by alkylation of salicylic acid.

The overbased detergent may be present at 0.2 wt % to 15 wt %, or 0.3 wt % to 10 wt %, or 0.3 wt % to 8 wt %, or 0.4 wt % to 3 wt %. For example, in a heavy duty diesel engine, the detergent may be present at 2 wt % to 3 wt % of the lubricating composition. For a passenger car engine, the detergent may be present at 0.2 wt % to 1 wt % of the lubricating composition.

Metal-containing detergents contribute sulfated ash to a lubricating composition. Sulfated ash may be determined by ASTM D874. In one embodiment, the lubricating composition of the invention comprises a metal-containing detergent in an amount to deliver at least 0.4 weight percent sulfated ash to the total composition. In another embodiment, the metal-containing detergent is present in an amount to deliver at least 0.6 weight percent sulfated ash, or at least 0.75 weight percent sulfated ash, or even at least 0.9 weight percent sulfated ash to the lubricating composition. In one embodiment, the metal-containing overbased detergent is present in an amount to deliver 0.1 weight percent to 0.8 weight percent sulfated ash to the lubricating composition.

In addition to ash and TBN, overbased detergents contribute detergent soap, also referred to as neutral detergent salt, to the lubricating composition. Soap, being a metal salt of the substrate, may act as a surfactant in the lubricating composition. In one embodiment, the lubricating composition comprises 0.05 weight percent to 1.5 weight percent detergent soap, or 0.1 weight percent to 0.9 weight percent detergent soap. In one embodiment, the lubricating composition contains no more than 0.5 weight percent detergent soap. The overbased detergent may have a weight ratio of ash:soap of 5:1 to 1:2.3, or 3.5:1 to 1:2, or 2.9:1 to 1:1:7.

Other Performance Additives

The compositions of the invention may optionally comprise one or more additional performance additives. These additional performance additives may include one or more metal deactivators, viscosity modifiers, antioxidants, friction modifiers, antiwear agents, corrosion inhibitors, dispersants, dispersant viscosity modifiers, extreme pressure agents, antioxidants (other than those of the invention), foam inhibitors, demulsifiers, pour point depressants, seal swelling agents, and any combination or mixture thereof. Typically, fully-formulated lubricating oil will contain one or more of these performance additives, and often a package of multiple performance additives In one embodiment, the invention provides a lubricating composition further comprising a dispersant, an antiwear agent, a dispersant viscosity modifier, a friction modifier, a viscosity modifier, an antioxidant, a detergent (different from that of the invention) or a combination thereof, where each of the additives listed may be a mixture of two or more of that type of additive. In one embodiment, the invention provides a lubricating composition further comprising a polyisobutylene succinimide dispersant, an antiwear agent, a dispersant viscosity modifier, a friction modifier, a viscosity modifier (typically an olefin copolymer such as an ethylene-propylene copolymer), an antioxidant (including phenolic and aminic antioxidants), an overbased detergent (including overbased sulfonates and phenates), or a combination thereof, where each of the additives listed may be a mixture of two or more of that type of additive.

In one embodiment, the invention provides a lubricating composition which further comprises ashless antioxidant. Ashless antioxidants may comprise one or more of arylamines, diarylamines, alkylated arylamines, alkylated diaryl amines, phenols, hindered phenols, sulfurized olefins, or mixtures thereof. In one embodiment the lubricating composition includes an antioxidant, or mixtures thereof. The antioxidant may be present at 0 wt % to 15 wt %, or 0.1 wt % to 10 wt %, or 0.5 wt % to 5 wt %, or 0.5 wt % to 3 wt %, or 0.3 wt % to 1.5 wt % of the lubricating composition.

The diarylamine or alkylated diarylamine may be a phenyl-α-naphthylamine (PANA), an alkylated diphenylamine, or an alkylated phenylnapthylamine, or mixtures thereof. The alkylated diphenylamine may include di-nonylated diphenylamine, nonyl diphenylamine, octyl diphenylamine, di-octylated diphenylamine, di-decylated diphenylamine, decyl diphenylamine and mixtures thereof. In one embodiment, the diphenylamine may include nonyl diphenylamine, dinonyl diphenylamine, octyl diphenylamine, dioctyl diphenylamine, or mixtures thereof. In one embodiment the alkylated diphenylamine may include nonyl diphenylamine, or dinonyl diphenylamine. The alkylated diarylamine may include octyl, di-octyl, nonyl, di-nonyl, decyl or di-decyl phenylnapthylamines.

The diarylamine antioxidant of the invention may be present on a weight basis of this lubrication composition at 0.1% to 10%, 0.35% to 5%, or even 0.5% to 2%.

The phenolic antioxidant may be a simple alkyl phenol, a hindered phenol, or coupled phenolic compounds.

The hindered phenol antioxidant often contains a secondary butyl and/or a tertiary butyl group as a sterically hindering group. The phenol group may be further substituted with a hydrocarbyl group (typically linear or branched alkyl) and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, 4-dodecyl-2,6-di-tert-butylphenol, or butyl 3-(3,5-ditert-butyl-4-hydroxyphenyl)propanoate. In one embodiment, the hindered phenol antioxidant may be an ester and may include, e.g., Irganox™ L-135 from Ciba.

Coupled phenols often contain two alkylphenols coupled with alkylene groups to form bisphenol compounds. Examples of suitable coupled phenol compounds include 4,4'-methylene bis-(2,6-di-tert-butyl phenol), 4-methyl-2,6-di-tert-butylphenol, 2,2'-bis-(6-t-butyl-4-heptylphenol); 4,4'-bis(2,6-di-t-butyl phenol), 2,2'-methylenebis(4-methyl-6-t-butylphenol), and 2,2'-methylene bis(4-ethyl-6-t-butylphenol).

Phenols of the invention also include polyhydric aromatic compounds and their derivatives. Examples of suitable polyhydric aromatic compounds include esters and amides of gallic acid, 2,5-dihydroxybenzoic acid, 2,6-dihydroxybenzoic acid, 1,4-dihydroxy-2-naphthoic acid, 3,5-dihydroxynaphthoic acid, 3,7-dihydroxy naphthoic acid, and mixtures thereof.

In one embodiment, the phenolic antioxidant comprises a hindered phenol. In another embodiment the hindered phenol is derived from 2,6-ditertbutyl phenol.

In one embodiment the lubricating composition of the invention comprises a phenolic antioxidant in a range of 0.01 wt % to 5 wt %, or 0.1 wt % to 4 wt %, or 0.2 wt % to 3 wt %, or 0.5 wt % to 2 wt % of the lubricating composition.

Sulfurized olefins are well known commercial materials, and those which are substantially nitrogen-free, that is, not containing nitrogen functionality, are readily available. The olefinic compounds which may be sulfurized are diverse in nature. They contain at least one olefinic double bond, which is defined as a non-aromatic double bond; that is, one connecting two aliphatic carbon atoms. These materials generally have sulfide linkages having 1 to 10 sulfur atoms, for instance, 1 to 4, or 1 or 2.

Ashless antioxidants may be used separately or in combination. In one embodiment of the invention, two or more different antioxidants are used in combination, such that there is at least 0.1 weight percent of each of the at least two antioxidants and wherein the combined amount of the ashless antioxidants is 0.5 to 5 weight percent. In one embodiment, there may be at least 0.25 to 3 weight percent of each ashless antioxidant.

In one embodiment, the invention provides a lubricating composition further comprising a molybdenum compound. The molybdenum compound may be selected from the group consisting of molybdenum dialkyldithiophosphates, molybdenum dithiocarbamates, amine salts of molybdenum compounds, and mixtures thereof. The molybdenum compound may provide the lubricating composition with 0 to 1000 ppm, or 5 to 1000 ppm, or 10 to 750 ppm, or 5 ppm to 300 ppm, or 20 ppm to 250 ppm of molybdenum.

Suitable dispersants for use in the compositions of the present invention include succinimide dispersants. In one embodiment, the dispersant may be present as a single dispersant. In one embodiment, the dispersant may be present as a mixture of two or three different dispersants, wherein at least one may be a succinimide dispersant.

The succinimide dispersant may be a derivative of an aliphatic polyamine, or mixtures thereof. The aliphatic polyamine may be aliphatic polyamine such as an ethylenepolyamine, a propylenepolyamine, a butylenepolyamine, or mixtures thereof. In one embodiment, the aliphatic polyamine may be ethylenepolyamine. In one embodiment, the aliphatic polyamine may be selected from the group consisting of ethylenediamine, diethylenetriamine, triethylenetetramine, tetraethylenepentamine, pentaethylenehexamine, polyamine still bottoms, and mixtures thereof.

The dispersant may be a N-substituted long chain alkenyl succinimide. Examples of N-substituted long chain alkenyl succinimide include polyisobutylene succinimide. Typically the polyisobutylene from which polyisobutylene succinic anhydride is derived has a number average molecular weight of 350 to 5000, or 550 to 3000 or 750 to 2500. Succinimide dispersants and their preparation are disclosed, for instance in U.S. Pat. Nos. 3,172,892, 3,219,666, 3,316,177, 3,340,281, 3,351,552, 3,381,022, 3,433,744, 3,444,170, 3,467,668, 3,501,405, 3,542,680, 3,576,743, 3,632,511, 4,234,435, Re 26,433, and 6,165,235, 7,238,650 and EP Patent 0 355 895B1.

The dispersant may also be post-treated by conventional methods by a reaction with any of a variety of agents. Among these are boron compounds, urea, thiourea, dimercaptothiadiazoles, carbon disulfide, aldehydes, ketones, carboxylic acids, hydrocarbon-substituted succinic anhydrides, maleic anhydride, nitriles, epoxides, and phosphorus compounds.

The dispersant may be present at 0.01 wt % to 20 wt %, or 0.1 wt % to 15 wt %, or 0.1 wt % to 10 wt %, or 1 wt % to 6 wt % of the lubricating composition.

In one embodiment, the lubricating composition of the invention further comprises a dispersant viscosity modifier. The dispersant viscosity modifier may be present at 0 wt % to 5 wt %, or 0 wt % to 4 wt %, or 0.05 wt % to 2 wt % of the lubricating composition.

Suitable dispersant viscosity modifiers include functionalized polyolefins, for example, ethylene-propylene copolymers that have been functionalized with an acylating agent such as maleic anhydride and an amine; polymethacrylates functionalized with an amine, or esterified styrene-maleic anhydride copolymers reacted with an amine. More detailed description of dispersant viscosity modifiers are disclosed in International Publication WO2006/015130 or U.S. Pat. Nos. 4,863,623; 6,107,257; 6,107,258; and 6,117,825. In one embodiment, the dispersant viscosity modifier may include those described in U.S. Pat. No. 4,863,623 (see column 2, line 15 to column 3, line 52) or in International Publication WO2006/015130 (see page 2, paragraph [0008] and preparative examples are described at paragraphs [0065] to [0073]).

In one embodiment, the invention provides a lubricating composition which further includes a phosphorus-containing antiwear agent. Typically, the phosphorus-containing antiwear agent may be a zinc dialkyldithiophosphate. Zinc dialkyldithiophosphates are known in the art. The antiwear agent may be present at 0 wt % to 3 wt %, or 0.1 wt % to 1.5 wt %, or 0.5 wt % to 0.9 wt % of the lubricating composition.

In one embodiment, the invention provides a lubricating composition further comprising a friction modifier. Examples of friction modifiers include long chain fatty acid derivatives of amines, fatty esters, or epoxides; fatty imidazolines such as condensation products of carboxylic acids and polyalkylene-polyamines; amine salts of alkylphosphoric acids; fatty alkyl tartrates; fatty alkyl tartrimides; or fatty alkyl tartramides. The term fatty, as used herein, can mean having a C8-22 linear alkyl group.

Friction modifiers may also encompass materials such as sulfurized fatty compounds and olefins, molybdenum dialkyldithiophosphates, molybdenum dithiocarbamates, sunflower oil or monoester of a polyol and an aliphatic carboxylic acid.

In one embodiment the friction modifier may be selected from the group consisting of long chain fatty acid derivatives of amines, long chain fatty esters, or long chain fatty epoxides; fatty imidazolines; amine salts of alkylphosphoric acids; fatty alkyl tartrates; fatty alkyl tartrimides; and fatty alkyl tartramides. The friction modifier may be present at 0 wt % to 6 wt %, or 0.05 wt % to 4 wt %, or 0.1 wt % to 2 wt % of the lubricating composition.

In one embodiment, the friction modifier may be a long chain fatty acid ester. In another embodiment the long chain fatty acid ester may be a mono-ester or a diester or a mixture thereof, and in another embodiment, the long chain fatty acid ester may be a triglyceride.

Other performance additives such as corrosion inhibitors include those described in paragraphs 5 to 8 of U.S. application Ser. No. 05/038,319, published as WO2006/047486, octyl octanamide, condensation products of dodecenyl succinic acid or anhydride and a fatty acid such as oleic acid with a polyamine. In one embodiment, the corrosion inhibitors include the Synalox® (a registered trademark of The Dow Chemical Company) corrosion inhibitor. The Synalox® corrosion inhibitor may be a homopolymer or copolymer of propylene oxide. The Synalox® corrosion inhibitor is described in more detail in a product brochure with Form No. 118-01453-0702 AMS, published by The Dow Chemical Company. The product brochure is entitled "SYNALOX Lubricants, High-Performance Polyglycols for Demanding Applications."

The lubricating composition may further include metal deactivators, including derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors, including copolymers of ethyl acrylate and 2-ethylhexylacrylate and copolymers of ethyl acrylate and 2-ethylhexylacrylate and vinyl acetate; demulsifiers including trialkyl phosphates, polyethylene glycols, polyethylene oxides, polypropylene oxides and (ethylene oxide-propylene oxide) polymers; and pour point depressants, including esters of maleic anhydride-styrene, polymethacrylates, polyacrylates or polyacrylamides.

Pour point depressants that may be useful in the compositions of the invention further include polyalphaolefins, esters of maleic anhydride-styrene, poly(meth)acrylates, polyacrylates or polyacrylamides.

In different embodiments the lubricating composition may have a composition as described in the following table:

| Additive | Embodiments (wt %) | | |
|---|---|---|---|
| | A | B | C |
| Antioxidant of Invention | 0.05 to 1 | 0.2 to 3 | 0.5 to 2 |
| Dispersant | 0.05 to 12 | 0.75 to 8 | 0.5 to 6 |
| Dispersant Viscosity Modifier | 0 or 0.05 to 5 | 0 or 0.05 to 4 | 0.05 to 2 |
| Overbased Detergent | 0 or 0.05 to 15 | 0.1 to 10 | 0.2 to 8 |
| Additional Antioxidant | 0 or 0.05 to 15 | 0.1 to 10 | 0.5 to 5 |
| Antiwear Agent | 0 or 0.05 to 15 | 0.1 to 10 | 0.3 to 5 |
| Friction Modifier | 0 or 0.05 to 6 | 0.05 to 4 | 0.1 to 2 |
| Viscosity Modifier | 0 or 0.05 to 10 | 0.5 to 8 | 1 to 6 |
| Any Other Performance Additive | 0 or 0.05 to 10 | 0 or 0.05 to 8 | 0 or 0.05 to 6 |
| Oil of Lubricating Viscosity | Balance to 100% | Balance to 100% | Balance to 100% |

The present invention provides a surprising ability to prevent damage to an engine in operation due to pre-ignition events resulting from direct gasoline injection into the combustion chamber. This is accomplished while maintaining fuel economy performance, low sulfated ash levels, improved deposit control, and other limitations, required by increasingly stringent government regulations.

INDUSTRIAL APPLICATION

As described above, the invention provides for a method of lubricating an internal combustion engine comprising supplying to the internal combustion engine a lubricating composition as disclosed herein. Generally, the lubricant is added to the lubricating system of the internal combustion engine, which then delivers the lubricating composition to the critical parts of the engine, during its operation, that require lubrication The lubricating compositions described above may be utilized in an internal combustion engine. The engine components may have a surface of steel or aluminum (typically a surface of steel), and may also be coated for example with a diamondlike carbon (DLC) coating.

An aluminum surface may be comprised of an aluminum alloy that may be a eutectic or hyper-eutectic aluminum alloy (such as those derived from aluminum silicates, aluminum oxides, or other ceramic materials). The aluminum surface may be present on a cylinder bore, cylinder block, or piston ring having an aluminum alloy, or aluminum composite.

The internal combustion engine may be fitted with an emission control system or a turbocharger. Examples of the emission control system include diesel particulate filters (DPF), or systems employing selective catalytic reduction (SCR).

The internal combustion engine of the present invention is distinct from a gas turbine. In an internal combustion engine, individual combustion events translate from a linear reciprocating force into a rotational torque through the rod and crankshaft. In contrast, in a gas turbine (which may also be referred to as a jet engine) a continuous combustion process generates a rotational torque continuously without translation, and can also develop thrust at the exhaust outlet. These differences in operation conditions of a gas turbine and internal combustion engine result in different operating environments and stresses.

The lubricant composition for an internal combustion engine may be suitable for any engine lubricant irrespective of the sulfur, phosphorus or sulfated ash (ASTM D-874) content. The sulfur content of the engine oil lubricant may be 1 wt % or less, or 0.8 wt % or less, or 0.5 wt % or less, or 0.3 wt % or less. In one embodiment, the sulfur content may be in the range of 0.001 wt % to 0.5 wt %, or 0.01 wt % to 0.3 wt %. The phosphorus content may be 0.2 wt % or less, or 0.12 wt % or less, or 0.1 wt % or less, or 0.085 wt % or less, or 0.08 wt % or less, or even 0.06 wt % or less, 0.055 wt % or less, or 0.05 wt % or less. In one embodiment the phosphorus content may be 100 ppm to 1000 ppm, or 200 ppm to 600 ppm. The total sulfated ash content may be 2 wt % or less, or 1.5 wt % or less, or 1.1 wt % or less, or 1 wt % or less, or 0.8 wt % or less, or 0.5 wt % or less, or 0.4 wt % or less. In one embodiment, the sulfated ash content may be 0.05 wt % to 0.9 wt %, or 0.1 wt % to 0.2 wt % or to 0.45 wt %.

In one embodiment, the lubricating composition may be an engine oil, wherein the lubricating composition may be characterized as having at least one of (i) a sulfur content of 0.5 wt % or less, (ii) a phosphorus content of 0.1 wt % or less, (iii) a sulfated ash content of 1.5 wt % or less, or combinations thereof.

EXAMPLES

The invention will be further illustrated by the following examples, which set forth particularly advantageous embodiments. While the examples are provided to illustrate the invention, they are not intended to limit it.

Lubricating Compositions

A series of 5W-20 engine lubricants in Group II base oil of lubricating viscosity are prepared containing the additives described above as well as conventional additives including polymeric viscosity modifier, ashless succinimide dispersant, overbased detergents, antioxidants (combination of phenolic ester and diarylamine), zinc dialkyldithiophosphate (ZDDP), as well as other performance additives as follows (Table 1). The phosphorus, sulfur and ash contents of each of the examples are also presented in the table in part to show that each example has a similar amount of these materials and so provide a proper comparison between the comparative and invention examples.

TABLE 1

Lubricating Oil Composition Formulations[1]

| | COMP EX1 | INV EX2 | INV EX3 | INV EX4 | INV EX5 | INV EX6 |
|---|---|---|---|---|---|---|
| Group III Base Oil | | | Balance to = 100% | | | |
| Ca Sulfonate 1[2] | 0 | 0.26 | 1.13 | 0 | 0.76 | 0.51 |
| Ca Sulfonate 2[3] | 0 | 0.12 | 0 | 0.06 | 0.35 | |
| Ca Sulfonate 3[4] | 1.0 | 0 | 0 | 0 | 0 | 0 |
| Ca Phenate[5] | 0 | 0 | 0 | 1.4 | 0 | 0 |
| Na Sulfonate[6] | 0.18 | 0.09 | 0 | 0 | 0.26 | 0.18 |
| Mg Sulfonate[7] | 0 | 0 | 0 | 0 | 0 | 0 |
| Ashless Antioxidant[8] | 1.4 | 0.725 | 1.4 | 2.0 | 2.18 | 4.0 |
| Dispersant[9] | 2.5 | 1.2 | 2.0 | 4.6 | 3.6 | 2.4 |
| ZDDP | 0.76 | 0.4 | 0.7 | 0.45 | 1.1 | 0.76 |
| VI Improver | 1.0 | 1.0 | 2.1 | 1.1 | 1.0 | 0.55 |
| Additional Additives[10] | 1.0 | 0.85 | 1.4 | 0.58 | 2.1 | 2.0 |
| % Phosphorus | 0.076 | 0.038 | 0.060 | 0.046 | 0.11 | 0.076 |
| % Calcium | 0.168 | 0.084 | 0.234 | 0.123 | 0.251 | 0.168 |
| % Sodium | 0.049 | 0.024 | 0 | 0 | 0.073 | 0.049 |
| % Molybdenum (ppm) | 0 | 46 | 0 | 0 | 140 | 90 |
| TBN | 10.8 | 3.84 | 7.75 | 6.1 | 11.5 | 10.8 |
| % Ash | 0.9 | 0.44 | 0.9 | 0.50 | 1.31 | 0.88 |

[1]All amounts shown above are in weight percent and are on an oil-free basis unless otherwise noted.
[2]Ca Sulfonate 1: Overbased calcium sulfonate with oil free TBN of 520; metal ratio of 10
[3]Ca Sulfonate 2: Overbased calcium sulfonate with oil free TBN of 690; metal ratio of 18
[4]Ca Sulfonate 3: Overbased calcium sulfonate with oil free TBN of 160; metal ratio of 2.8
[5]Ca Phenate: "Neutral" calcium phenate with oil free TBN of 200; metal ratio of 1.2
[6]Na Sulfonate: Overbased Na sulfonate with oil free TBN of 650
[7]Mg Sulfonate: Overbased Mg sulfonate with oil free TBN of 600
[8]Combination of alkylated diarylamine and hindered phenol antioxidants
[9]Dispersant: PIBsuccinimide prepared from 2000 Mn PIB
[10]The Additional Additives used in the examples include friction modifiers, pourpoint depressants, anti-foam agents, corrosion inhibitors, and includes some amount of diluent oil

TABLE 2

Lubricating Oil Composition Formulations (5W-30)

| | EX7 | EX8 | EX9 | EX10 | EX11 | EX12 | EX13 |
|---|---|---|---|---|---|---|---|
| Group III Base Oil | | | | Balance to = 100% | | | |
| Ca Sulfonate[2] | 2.78 | 1.12 | 1.12 | 0.95 | 2.62 | 0.29 | 2.78 |
| Mg Sulfonate[3] | 0 | 0 | 0 | 0 | 0 | 2.92 | 0 |
| Na Sulfonate | 0 | 0 | 0 | 0.15 | 0 | 0 | 0 |
| Ca Phenate[4] | 0 | 0 | 0 | 0 | 0.58 | 0 | 0 |
| Dispersant | 2.72 | 2.72 | 2.72 | 2.72 | 2.0 | 2.0 | 2.0 |
| Ashless Antioxidant[5] | 1.6 | 1.6 | 1.6 | 1.6 | 0.85 | 0.85 | 0.85 |
| ZDDP | 0.32 | 0.32 | 0.77 | 0.77 | 0.32 | 0.32 | 0.32 |
| VI Improver | 0.6 | 0.6 | 0.6 | 0.6 | 0.6 | 0.4 | 0.6 |
| Additional Additives[6] | 0.9 | 0.9 | 0.9 | 0.9 | 0.36 | 0.36 | 0.36 |
| % Calcium | 0.75 | 0.25 | 0.25 | 0.21 | 0.72 | 0.064 | 0.71 |
| % Magnesium | 0 | 0 | 0 | 0 | 0 | 0.42 | 0 |
| % Sodium | 0 | 0 | 0 | 0.045 | 0 | 0 | 0 |

TABLE 2-continued

Lubricating Oil Composition Formulations (5W-30)

|  | EX7 | EX8 | EX9 | EX10 | EX11 | EX12 | EX13 |
|---|---|---|---|---|---|---|---|
| Sulfated Ash | 2.52 | 0.92 | 0.99 | 0.99 | 2.52 | 2.26 | 2.52 |
| % Phosphorus | 0.03 | 0.03 | 0.076 | 0.076 | 0.03 | 0.03 | 0.03 |

[1] All amounts shown above are in weight percent and are on an oil-free basis unless otherwise noted less otherwise noted.
[2] Ca Sulfonate is one or more overbased calcium alkylbenzene sulfonic acid with TBN at least 300 and metal ratio at least 10
[3] Overbased magnesium sulfonate with TBN of ~600
[4] Sulfur coupled phenate salt of calcium with TBN of ~200
[5] Ashless antioxidant - mixture of nonylated and dinonylatyd diphenylamine, hindered phenol ester and sulfurized olefin
[6] The Additional Additives used in the examples include friction modifiers, pourpoint depressants, anti-foam agents, corrosion inhibitors, and includes some amount of diluent oil.

Testing

Low Speed Pre-ignition events are measured in two engines, a Ford 2.0 L Ecoboost engine and a GM 2.0 L Ecotec. Both of these engines are turbocharged gasoline direct injection (GDI) engines. The Ford Ecoboost engine is operated in two stages. In the first stage, the engine is operated at 1500 rpm and 14.4 bar brake mean effective pressure (BMEP). During the second stage, the engine is operated at 1750 rpm and 17.0 bar BMEP. The engine is run for 25,000 combustion cycles in each stage, and LSPI events are counted.

The GM Ecotec engine is operated at 2000 rpm and 22.0 bar BMEP with an oil sump temperature of 100° C. The test consists of nine phases of 15,000 combustion cycles with each phase separated by an idle period. Thus, combustion events are counted over 135,000 combustion cycles.

LSPI events are determined by monitoring peak cylinder pressure (PP) and mass fraction burn (MFB) of the fuel charge in the cylinder. When both criteria are met, it is determined that an LSPI event has occurred. The threshold for peak cylinder pressure is typically 9,000 to 10,000 kPa. The threshold for MFB is typically such that at least 2% of the fuel charge is burned late, i.e. 5.5 degrees After Top Dead Center (ATDC). LSPI events can be reported as events per 100,000 combustion cycles, events per cycle, and/or combustion cycles per event.

TABLE 4

GM Ecotec LSPI Testing

|  | EX7 | EX8 | EX9 | EX10 | EX11 | EX12 | EX13 |
|---|---|---|---|---|---|---|---|
| PP Events | 26 | 17 | 11 | 6 | 33 | 4 | 44 |
| MFB Events | 29 | 18 | 12 | 7 | 36 | 3 | 46 |
| Total Events | 26 | 17 | 11 | 6 | 32 | 3 | 43 |
| Total Cycles | 135000 | 135000 | 135000 | 135000 | 135000 | 135000 | 135000 |
| Ave. PP | 18440 | 20670 | 20520 | 13300 | 18980 | 17370 | 18860 |
| Events per 100,000 cycles | 19.2 | 12.6 | 8.1 | 4.4 | 23.7 | 2.2 | 31.8 |
| Cycles per event | 5192 | 7941 | 12273 | 22500 | 4219 | 45000 | 3140 |

The data indicates that a reduction in total detergent ash below 1 weight percent results in a reduction in LSPI events. Partial replacement of calcium detergent with magnesium and/or sodium detergent also provided an observed reduction in LSPI events. In addition, partial replacement of sulfonate detergent with phenate-based detergent resulted in a reduction in observable LSPI events.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference, as is the priority document and all related applications, if any, which this application claims the benefit of. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); (ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulphoxy); (iii) hetero substituents, that is, substituents which, while having a predominantly hydrocarbon character, in the context of this invention, contain other than carbon in a ring or chain otherwise composed of carbon atoms.

Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims

What is claimed:

1. A method for reducing low speed pre-ignition events in a spark-ignited direct injection internal combustion engine wherein the engine is equipped with a turbocharger and is operated under a load with a brake mean effective pressure (BMEP) of greater than or equal to 12 bars at speeds less than or equal to 3,000 rpm, comprising supplying to the engine a lubricant composition comprising:
   (a) a base oil of lubricating viscosity;
   (b) a magnesium sulfonate overbased detergent in an amount to provide at least 500 ppm magnesium from the magnesium sulfonate overbased detergent to the lubricating composition;
   (c) a calcium sulfonate overbased detergent in an amount to provide at least 1,000 ppm of calcium from the calcium sulfonate overbased detergent to the lubricating composition;
   (d) 0.5 to 0.9 wt. % of a zinc dialkyldithiophosphate anti-wear additive; and
   (e) 0.5 to 15 weight percent of one or more additional additives;
wherein the magnesium sulfonate overbased detergent and the calcium sulfonate overbased detergent collectively contribute up to about 0.8 weight percent of sulfated ash to the lubricating composition and wherein the lubricating composition has a phosphorus content of 0.12 wt. % or less and total sulfated ash of 1.1% or less.

2. The method of claim 1, wherein the engine is fueled with a liquid hydrocarbon fuel, a liquid nonhydrocarbon fuel, or mixtures thereof.

3. The method of claim 2, wherein the engine is fueled by natural gas, liquefied petroleum gas (LPG), compressed natural gas (CNG), or mixtures thereof.

4. The method of claim 1, wherein the one or more additional additives is selected from an ashless dispersant, an ashless antioxidant, a friction modifier, and a polymeric viscosity modifier.

5. The method of claim 1, wherein the magnesium overbased detergent has a metal ratio of 5 to 30.

6. The method of claim 1, wherein the magnesium overbased detergent is present in an amount from 0.2 to 8 weight percent of the lubricant composition.

7. The method of claim 1, wherein the one or more additional additives is a polyalkenyl succinimide dispersant in an amount from 0.5 to 4 weight % of the lubricating composition.

8. The method of claim 1, wherein the base oil comprises at least 50 weight % of a Group II base oil, a Group III base oil, or mixtures thereof.

9. The method of claim 1, wherein there is a reduction in the number of LSPI events of at least 10 percent.

10. The method of claim 1, wherein the low speed pre-ignition events are reduced to less than 20 LSPI events per 100,000 combustion events.

* * * * *